United States Patent [19]

Goodale et al.

[11] Patent Number: 5,125,075
[45] Date of Patent: Jun. 23, 1992

[54] SYSTEM FOR CIRCULATING SERIALLY AN ELECTRONIC, NON-INTERCHANGEABLE UNIQUE, ROUTE PACKAGE FROM SENDER TO SELECTED RECIPIENTS

[75] Inventors: Thomas C. Goodale, Reading, Mass.; Janet Hanson, Londonderry, N.H.; Lee M. Truchon, Andover, Mass.

[73] Assignee: Wang Laboratories, Inc., Lowell, Mass.

[21] Appl. No.: 474,660

[22] Filed: Feb. 5, 1990

Related U.S. Application Data

[63] Continuation of Ser. No. 94,351, Sep. 8, 1987, abandoned.

[51] Int. Cl.⁵ .................. G06F 13/00; G06F 15/21; G06F 15/56
[52] U.S. Cl. .................. 395/200; 364/225.6; 364/241.7; 364/242.96; 364/919.5; 364/927.2; 364/943.5; 364/419; 364/DIG. 2
[58] Field of Search ... 364/200 MS File, 900 MS File, 364/419

[56] References Cited

U.S. PATENT DOCUMENTS

| | | | |
|---|---|---|---|
| 4,503,499 | 3/1985 | Mason et al. | 364/200 |
| 4,532,588 | 7/1985 | Foster | 364/200 |
| 4,648,061 | 3/1987 | Foster | 364/900 |
| 4,713,780 | 12/1987 | Schultz et al. | 364/514 |
| 4,754,428 | 6/1988 | Schultz et al. | 364/900 |
| 4,932,026 | 6/1990 | Deu et al. | 370/94.1 |

FOREIGN PATENT DOCUMENTS

| | | | |
|---|---|---|---|
| 0147264 | 9/1983 | Japan | 364/900 |
| 2089619 | 6/1982 | United Kingdom | |

OTHER PUBLICATIONS

"Active Message Processing:Messages as Messengers", John Vittal, *In Proceedings of the IFIPTC Inter. Symp. on Comp. Message, System*, North Holland, Amsterdam, 1981, pp. 175-184.

"A Distributed Interoffice Mail System" by Shiro Sakata and Tetsuo Ueda, *Computer*, vol. 18, No. 10, Oct. 1985, pp. 106-116.

"Envoys in Electronic Mail Systems" by Eric Gold, in the *Third ACM-SIGOIS Conference on Office Information Systems*, Oct. 6-8, 1986, Rhode Island, Reprinted in the SIGOIS Bulletin, vol. 7, Nos 2-3, Summer-Fall 1986 Edited by Carl Hewitt & Stanley Zdonik, pp. 1-10.

"GILT-Open Interconnection of Local Message Systems in Europe", A. Ahtiainen et al., *7th International Conference on Computer Communication*, Sydney, Australia, Oct. 30-Nov. 2, 1984, pp. 740-746.

"Computer-Based Real-Time Conferencing Systems" by S. Sarin, *Computer*, vol. 18, No. 10, Oct. 1985, pp. 33-45.

Primary Examiner—Thomas C. Lee
Assistant Examiner—Ayni Mohamed
Attorney, Agent, or Firm—Michael H. Shanahan

[57] ABSTRACT

A mail circulation device enables serial delivery of a unique, non-interchangeable route package containing mail items and a route list of desired recipients, to each listed recipient. The mail items of the route package are originals, as sent by the sender, throughout the circulation. The route list also specifies the type of action each recipient is allowed to take with respect to the route package. Votes of approval and comments of the mail items of the route package by each recipient are recorded in a data file which associates the mail items and route list. The identity of recipients may be validated by requiring each recipient to enter a unique password for voting at the time of voting. The route list may be altered by specified listed recipients such that the mail items and altered route list are circulated, as the route package, to additional recipients or not circulated to initially listed recipients. The delivery and voting status of the package may be recorded in a separate data record such that the originator is able to read the status of the route package at any time during the circulation.

18 Claims, 25 Drawing Sheets

```
***********************************************
*                                              *
* Hello: J. User              Monday 09/29/86 10:28 am
* Position Cursor and Press RETURN
*
*       View:   _ Mailbox
*               _ Bulletin Board
*               _ Confirmations
*
*       Send:   _ Memo
*               _ Phone Message
*               _ Invitation
*               _ Package
*
*       Other:  _ Distribution Lists
*               _ Route Lists
*               _ Post To Bulletin Board
*               _ Designate Alerts Moniter
*               _ Return to Main Menu
*                                          ↖ 23
***********************************************
```

*Fig. 2*

```
Manage Route Lists                   Monday,  09/29/86  10:29 am

Name             Owner      Entries    Last Modified    Access

APPROVAL LIST   J User        5         09/29/86       Public
 EXPENSE APPR    J User        8         09/29/86       Private
 EQUIPMENT       J User        4         09/29/86       Private (-End-)
---------------------------------------------------------------
(RETURN) View                                  (13) Instructions
          (6) Edit List
          (7) Create List                      (15) Print
          (8) Delete List                      (16) Exit
```

```
Corporate Director   People        Monday    09/29/86  10:29 am

Mark each item to add to the Route list

Name            Organization     Location        Job Description

Cahl Good       R&D              Tower II         Engineer
- Jane Hans       R&D              Tower II         Engineer
- Lee Tru         R&D              Tower II         Engineer
- Sam Wall        QA               Tower I          Engineer
- Bo White        Marketing        Tower III        Analyst -----------------------------------------------------------------
(RETURN) Continue   (5) Next       (9) Find         (13) Instructions
     (2) First      (6) Mark All
     (3) Last       (7) Clear All
     (4) Prev                                       (16) Cancel
```

```
*********************************************
Route List Recipients              Monday  09/29/86  10:31 am
Use the PF-Keys to delete, duplicate, re-order or add new recipients List Name: VAC   APPR      Recipients:  4     Access: Private Recipient Name       Voting Options               List Editing

- Cahl Good          Accept - Reject/Cont         Yes
- Sam  Wall          Accept - Reject/Cont         *No
- Lee  Tru          *Accept- Reject/ret - Abs     Yes
- Jane Hans          No Decision                  *No
- J User             No Decision                  Yes (-End-)

(RETURN) Accept          (9)  Change Access   (13) Instructions
(6) Change Voting       (10) Copy Recipient   (15) Print
(7) Change List Ed      (11) Move Recipient   (16) Exit
(8) Delete Recipient    (12) Add Recipient
*********************************************
```

```
*****************************************
*                                                                           *
* Manage Route Lists        Monday  09/29/86  10:29 am                      *
*                                                                           *
* Name            Owner     Entries   Last Modified   Access                *
*                                                                           *
* — APPROVAL LIST  J User      5        09/29/86       Public               *
* — EXPENSE APPR   J User      8        09/29/86       Private              *
* — EQUIPMENT      J User      4        09/29/86       Private              *
* — VAC APPR       J User      5        09/29/86       Private              *
*                                                                           *
*                                                             (-End-)       *
* -------------------------------------------------------------------        *
* (RETURN) View              (13) Instructions                              *
*     (6) Edit List                                                         *
*     (7) Create List         (15) Print                                    *
*     (8) Delete List         (16) Exit                                     *
*                                                                           *
*****************************************
```

```
Package                        Monday    09/29/86  10:33
To:
Subject:                    Package contains 1 item
------------------------------------------------------------
  _ DP File
  _ WP Document
  _ WP Plus Document
  _ WP Plus Glossary
  _ WP Plus Display File
  _ Create Memo
  _ OFFICE Indexer
  _ Select from Folder
------------------------------------------------------------
(RETURN) Select    (6) Package Content   (9) Address    (13) Instructions
(1) Send                                 (10) Save
                                         (11) Mail Class           (16) Exit
```

```
*********************************************
* Mail Classification      Monday  09/29/86 10:34
* To:      _____
* Subject: _____  Author: J User
*- - - - - - - - - - - - - - - - - - - - - - -
* Delivery
* Confirmation:  X Yes      No
*                 (if yes, optionally)  _ Acknowledge (or)
*                                       _ Certify
* Priority:    _ Low    X Normal        _ High      Immediate
* Security:    _ General X Limited      _ Confidential
* Type:        X Action    Information  _ Reference
* Reply Date:  __ __ __  (optional)
*              MM DD YY
*- - - - - - - - - - - - - - - - - - - - - - -
* (RETURN) Accept       (9) Change Author   (13) Instructions
*                      (11) Route Defaults  (16) Exit
*********************************************
```
↙ 37

*Fig. 8*

```
*********************************************
Route Defaults             Monday    09/29/86  10:34
To:       _____
Subject:  _____   Author:  J User
---------------------------------------------
Voting Option:
          _ No decision required
          _ Accept or reject
          X Accept or reject or abstain If rejected then pick one:
          _ Continue routing
          X Return to originator
          _ Allow recipient to continue or return to originator Allow recipients to edit the route list:
          Yes    X No
---------------------------------------------
(RETURN) Accept                    (13) Instructions

(16) Exit
                                                    ← 39
*********************************************
```

*Fig. 9*

```
Addressing Menu                    Monday 09/29/86 10:28 am
Position Cursor and Press RETURN Distribution:  |_ People
                           |_ Organizations
                           |_ Lists
                           |_ Freeform Addressing Routing:       |_ People
                           |_ Lists
                           |_ Continue
                           |_ Cancel Addressing
```

(1) Continue                        (13) Instructions
                                    (14) Recipients

(16) Cancel

```
************************************************
Route Package Recipients           Monday    09/29/86  10:31 am
Use the PF-Keys to delete, duplicate, re-order or add new recipients Recipient Name        Voting Options              List Editing – Cahl Good           Accept - Reject/Cont        Yes
– Sam  Wall           Accept - Reject/Cont        *No
– Lee Tru            *Accept- Reject/Ret - Abs    Yes
– Jane Hans           No Decision                 *No
– J User              No Decision                 Yes (-End-)
------------------------------------------------
(RETURN) Accept (6) Change Voting    (10) Copy Recipient   (13) Instructions
          (7) Change List Ed   (11) Move Recipient   (15) Print
          (8) Delete Recipient (12) Add Recipient    (16) Cancel
************************************************
```

```
************************************************
*                                              *
* Route List Addressing    Monday  09/29/86  10:29 am
* Use any character to select a list
*   Name           Owner     Entries  Last Modified   Access
* ----------------------------------------------------------
* - APPROVAL LIST  J User       5     09/29/86        Public
* - EXPENSE APPR   J User       8     09/29/86        Private
* - EQUIPMENT      J User       4     09/29/86        Private
* - VAC APPR       J User       3     09/26/86        Public
* - PEP APPROVAL   Cahl Good   15     09/01/86        Public
* - DCR LIST       Lee Tru      8     09/02/86        Public
* - R&D LIST       Ed McHale    4     09/05/86        Public
* ----------------------------------------------------------
*
* (RETURN) Continue               (13) Instructions
*                                 (14) View List
*
*                                 (16) Exit
*                                              *
************************************************
                        ↖ 45
```

*Fig. 12*

```
************************************************
Folder: Mailbox                   Monday   09/29/86  10:32

Name: Lee Tru

Subject/Phone Number    Author/Caller    Date      Content    Status
---------------------------------------------------------------
- Vacat Request Form    J User           09/29/86  Rte Pack   Not Read
- Software Update       Cahl Good.       09/29/86  Comp Rte   Not Read
- Status Meeting        Lee Tru          09/29/86  Memo       Read
- Walk-thru Meeting     Jane Hans        09/29/86  Rte Pack   Read (-End-)
---------------------------------------------------------------
(RETURN) View         (9)  Selective view   (13) Instructions
  (6) Expand index    (10) Move items       (14) Recipients
  (7) Acknowledge     (11) Change folder    (15) Print
  (8) Delete items    (12) Change name      (16) Exit
************************************************
```

```
Folder: Mailbox            Monday       09/29/86  10:33

To: Lee Tru              Creator: J User
Subject: Vacat Request Form   Date: 09/29/86
                         Content: Route Package Title              Content          Addendum Author
- Changes to Office  Memo
- New Screens        WP Document
- Quick Comment      Memo             Cahl Good
- What if .....      Memo             Sam Wall (-End-)
(1) Reply       (5) Next Item       (9) Send Along    (13) Instructions
                (6) Assign Keywords                   (14) Recipients
                                                      (15) Print Item/Pkg
                                                      (16) Exit
(4) / Prev. Item
```

```
***********************************************
* Route Package Recipients        Monday    09/29/86  16:33 *
*                                                           *
* To: Lee Tru            Recipients: 5                      *
* Subject: Vacat Request Form                               *
*                                                           *
* Recipient Name    Vote     Date      Time   Documents Added *
*                                                           *
* - Cahl Good       Yes     9/29/86    9:10       1         *
* - Sam Wall        Abstain 9/29/86    1:00       1         *
* - Lee Tru         <<Current Recipient>>                   *
* - Jane Hans                                               *
* - J User                                                  *
*                                                           *
* ----------------------------------------------- (-End-)   *
*                                                           *
*                     (9 ) View Options (13) Instructions   *
*                     (10) Copy Recipient                   *
*                     (11) Move Recipient                   *
* (8) Delete Recipient (12) Add Recipient     (16) Exit     *
*                                                           *
*                                              ↙ 51         *
***********************************************
```

*Fig. 15a*

```
*********************************************
Route Package Recipients          Monday    09/29/86  16:33

To: Lee Tru               Recipients: 5
Subject: Vacat Request Form

Recipient Name        Voting Options              List Editing

— Cahl Good           Accept - Reject/Cont         Yes
— Sam  Wall           Accept - Reject/Cont         *NO
— Lee Tru            * Accept- Reject/Ret.- Abs    Yes
— Jane Hans           No Decision                  *No
— J User              No Decision                  Yes (9) View Votes      (13) Instructions
                             (10) Copy Recipient
                             (11) Move Recipient
(8) Delete Recipient         (12) Add Recipient   (16) Exit
                                                            (-End-)
*********************************************
```

```
******************************************
* Package              Monday  09/29/86  16:35 *
* Press PF1 to send along the route package or select items to append *
* Next Recip: Jane Hans
* Subject:    Vacat Request Form
* Route Package
*                                              *
*                    Package contains 4 items  *
*                                              *
*  _ DP File                                   *
*  _ WP Document                               *
*  _ WP Plus Document                          *
*  _ WP Plus Glossary                          *
*  _ WP Plus Display File                      *
*  _ Create Memo                               *
*  _ OFFICE Indexer                            *
*  _ Select from Folder                        *
*                                              *
*------------------------------------------    *
* (RETURN) Select                      (13) Instructions *
* (1) Send Along   (6) Package Content (14) Recipients *
*                                      (16) Exit *
******************************************
```

```
*********************************************************
Route Package Voting        Monday    09/29/86  16:36
Next Recip: Jane Hans
Subject:    Vacat Request Form
- - - - - - - - - - - - - - - - - - - - - - - - - - - - -
         Password =    xxxxxxx Select One Choice:   __  Accept
                              __  Reject and Continue Routing
                              __  Reject and Return to Creator
                              __  Abstain
- - - - - - - - - - - - - - - - - - - - - - - - - - - - -
                                          (13) Instructions
                                          (14) Recipients (RETURN) Send Along                       (16) Exit
*********************************************************
```
↖ 55

Fig. 17

```
*********************************************************
Confirmation/Status Index          Monday    09/29/86  10:35

Name: J User
                                                Certify/
                               Delivery       Acknowledge
Subject         Content  Date      Time    Status    Status

- Vac Reqst      Rte Pkg  08/10/86  15:11   Active      3
- Status Report  Memo     08/18/86  13:17   All      Not Requested
- Package Changes Rte Pkg 08/19/86  08:52   All      Not Requested --------------------------------------------------------- (-End-)
                                             (13) Instructions
                                             (15) Print
                                             (16) Exit
        (8) Delete Item(s)   (12) Change Name
---------------------------------------------------------
(RETURN) Select
*********************************************************
```
↖ 57

*Fig 18*

```
Confirmations: Confirmation Detail      Monday      09/29/86  10:35

Name: J User
Subject: Vac Reqst
                           Delivery            Certified
Addressee    Location    Date    Time       Date     Time Cahl Good    Tower II    9/10/86 09:15    9/10/86  09:20
Sam Wall     Tower I     9/12/86 15:00    9/12/86  15:15
Lee Tru      Tower II    9/15/86 11:00    9/15/86  11:30

(-End-)
---------------------------------------------------------
(8) Delete        (10) Route Detail      (13) Instructions
                                         (15) Print
                                         (16) Exit
```

*Fig. 19*

```
Confirmation: Route Detail        Monday    09/29/86  10:35

Name: J User
Subject: Vac Reqst
                                               Send Along
Addressee    Location    Vote        Date      Time Cahl Good    Tower II    Accept      9/12/86   14:00
Sam Wall     Tower I     Abstain     9/15/86   10:50
Lee Tru      Tower II    No Vote     Not Sent

(13) Instructions
                                          (15) Print
                                          (16) Exit
                                              (-End-)
```

*Fig. 20*

```
***************************************************
User Profile              Monday    09/29/86  12:05

Profile For: Lee Tru
---------------------------------------------------
Route Defaults
Voting Option:
    _  No decision required
    _  Accept or reject
    X  Accept or reject or abstain If rejected then pick one:
    _  Continue routing
    X  Return to originator
    _  Allow recipient to continue or return to originator Allow recipients to edit the route list:
    Yes    X No
---------------------------------------------------
(RETURN) Save/Continue                    (13) Instructions

(16) Exit
***************************************************
```
← 63

Fig. 21

SYSTEM FOR CIRCULATING SERIALLY AN ELECTRONIC, NON-INTERCHANGEABLE UNIQUE, ROUTE PACKAGE FROM SENDER TO SELECTED RECIPIENTS

This is a continuation of co-pending application Ser. No. 07/094,351 filed on Sep. 8, 1987, now abandoned.

BACKGROUND OF THE INVENTION

In many of today's businesses, notification to and approval by a hierarchy of people must often be made during the course of a project. For instance, a purchase order request from a project engineer may have to be approved through a pertinent chain of command which includes the head of the Engineering Department, the Purchasing Department and the Accounting Department. This approval process is usually accomplished by an inter-office document on which the various people in the chain of command respond.

With the advent of the computer, similar communication is enabled by electronic mail. Notification to and approval by the various pertinent people is accomplished by an originator (sender) sending a copy of a document or message to the necessary people via electronic mail. The message may be duplicated and distributed simultaneously to multiple receivers, or the message may be serially circulated from one desired receiver to the next. Typically, the electronic mail system also enables a reply response to be sent back to the sender from each receiver.

Various developments in electronic mail systems have been made in the past few years. Most improvements address efficiency and speed of electronic mail systems, and automating certain features such as return receipts and notices to a sender from a receiver indicating that he will not be answering any mail until he returns from vacation.

Other developments have been made in the distribution/circulation capabilities of electronic mail systems. In a typical circulation scheme of a message, a sender specifies on a list, which is part of the message, the desired recipients of the message. The list is usually arranged in order of to whom the message is to be sent first, second, and so on. The message is serially sent (i.e. sent to one person at a time) to each of the listed recipients. One circulation scheme enables a recipient to add his comments to the message before sending the message to the next recipient. Another circulation system attempts to control the number of copies made of a sent message in a distributed control environment. Other circulation systems enable the circulation of different media including text, graphics and images.

SUMMARY OF THE INVENTION

The present invention discloses a particular application in an apparatus for distributing the processing of data across a plurality of loci of control in a digital data processing system. Such apparatus is disclosed in related U.S. application Ser. No. 944,500 now U.S. Pat. No. 4,932,026 which is incorporated herein by reference.

The present invention discloses an electronic mail circulation device, especially one for obtaining comments and votes of approval from selected users of a digital data computer system. The mail circulation device provides means for enabling a sender to establish a circulation list and associate the item to be circulated with the circulation list.

The item and the circulation list are associated with each other in such a manner as to form a unique, noninterchangeable route package. That is, a copy of the item to be circulated cannot be substituted for the item in the route package. The circulation list specifies the prospective recipients selected by the sender. The circulation list may specify the order in which the recipients are to receive the route package. Electronic mail control means of the circulation device respond to the circulation list by serially delivering the route package to the recipients as specified on the circulation list.

When the circulation list provides an indication of the order in which the selected recipients are to serially receive the route package, controls of the electronic mail system respond to the circulation list for each selected recipient by providing the route package to the indicated succeeding recipient according to the circulation list.

The circulation list may require recipients to vote on the item. In that case the circulation list further specifies sender chosen voting options which determine how each recipient may vote on the item. For each recipient, after he receives the route package the electronic mail system control wait until he enters a password and votes on the item in the specified manner and subsequently delivers the route package to the next recipient. The electronic mail system control record the votes in a memory area which is accessible by the sender during the circulation. In this way, the sender can be informed of votes or confirmations as the route package is being circulated.

To that end, the circulation device may further include a separate vote status element in which votes from the recipients are recorded. The vote status element enables the sender to check the status of the item as it is being circulated.

The electronic mail system control also add any comments from the recipient to the route package so that succeeding recipients may be informed of the processing of the item by prior recipients.

In addition, the circulation list may specify that particular selected recipients may vote to interrupt circulation of the route package by returning it to the sender. If one of the particular selected recipients so votes, the control means returns the route package to the sender in response to the vote. The sender then has the option of continuing the circulation of the route package.

Further, the preferred circulation list may specify that certain selected recipients are permitted to alter the circulation list. When the circulation list is altered by one of the certain selected recipients, the electronic mail system control further respond to the circulation list by providing the item and the altered circulation list as the route package to the next selected recipient according to the altered circulation list.

In addition, a default manner of voting and/or list editing privileges may be applied to selected recipients for which the circulation list does not specify respective limits of voting and/or list editing. The defaults are preferably predefined by the sender.

The circulation device of the present invention provides for the circulated item to be an original as opposed to a copy throughout the circulation. This ensures veracity of the approval for the original item and not any false or duplicate orders.

The circulation list is preferably associated with the item by a data structure having a pointer to the item and a section corresponding to the circulation list. The section may be, for example, a series of records with one record for each recipient.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

FIG. 2 is an illustration of a main menu screen of the embodiment of FIG. 1.

FIG. 3 is an illustration of a Manage Route lists screen which lists existing route lists in the embodiment of FIG. 1.

FIG. 4 is an illustration of a Corporate Directory screen of the embodiment of FIG. 1.

FIG. 5 is an illustration of a Route List Recipients screen which displays recipients of a route list in the embodiment of FIG. 1.

FIG. 6 is an illustration of a Manage Route lists screen of FIG. 3 with a new entry.

FIG. 7 is an illustration of a Package screen from which route packages are formed in the embodiment of FIG. 1.

FIG. 8 is an illustration of a Mail Classification screen of the embodiment of FIG. 1.

FIG. 9 is an illustration of a Route Defaults screen of the embodiment of FIG. 1.

FIG. 10 is an illustration of an Addressing menu of the embodiment of FIG. 1.

FIG. 11 is an illustration of a Route Package Recipients screen which displays recipients of a route package in the embodiment of FIG. 1.

FIG. 12 is an illustration of a Route List Addressing screen from which a route list is chosen for a route package in the embodiment of FIG. 1.

FIG. 13 is an illustration of a Mailbox screen from which the user is notified of his mail items in the embodiment of FIG. 1.

FIG. 14 is an illustration of a screen view of a received route package of the embodiment of FIG. 1.

FIG. 15a is an illustration of a Route Recipients screen which displays current route recipients of a route package received by a recipient in the embodiment of FIG. 1.

FIG. 15b is an illustration of a screen to view route recipient options from the Route Recipients screen of FIG. 15a.

FIG. 16 is an illustration of a Package Comment screen of the embodiment of FIG. 1.

FIG. 17 is an illustration of a Route Package Voting screen of the embodiment of FIG. 1.

FIG. 18 is an illustration of a Confirmation/Status Index screen which displays a list of confirmations received by a user in the embodiment of FIG. 1.

FIG. 19 is an illustration of a Confirmation Detail screen of the embodiment of FIG. 1.

FIG. 20 is an illustration of a Route Detail screen of a confirmation of the embodiment of FIG. 1.

FIG. 21 is an illustration of a screen on which a user defines route package defaults in his User Profile of the embodiment of FIG. 1.

DETAILED DESCRIPTION OF THE PREFERRED EMBODIMENT

Figure 1A:
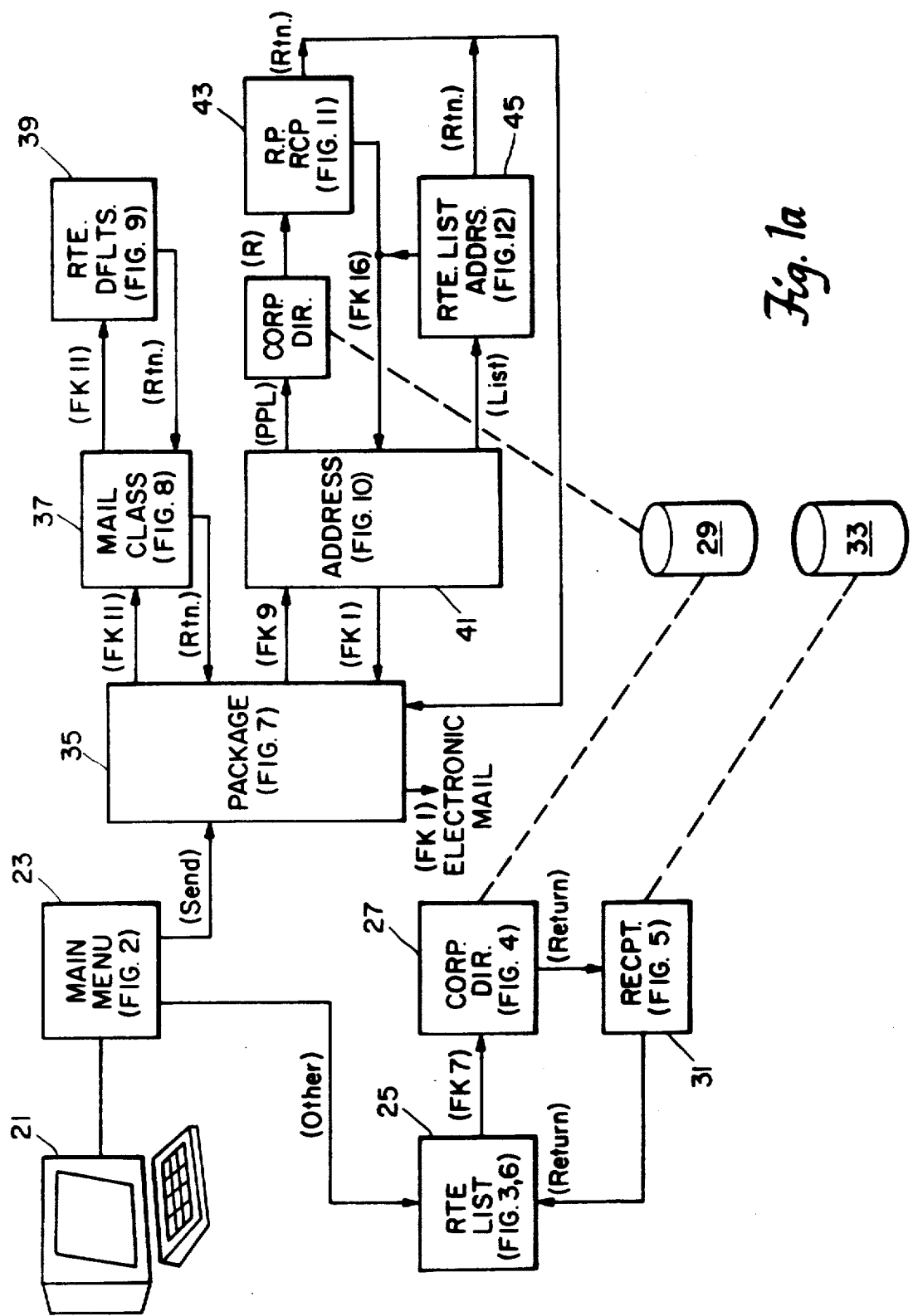
FIGS. 1a–b are block diagrams of the flow of control in an embodiment of the present invention.

In general, the present invention is to be applied to a network of computer terminals or workstations in an office where each person or department in the office has access to a terminal. The computer system, preferably a digital data processing system, supporting each terminal offers office automated features to the users (people operating respective terminals) of the system. These automated features are conventionally called applications and include for example electronic mail, time management (calendar) services, directory services, user administration, system administration and other services. Data employed or generated by these applications are organized and stored in respective databases. The control of data and the databases in the processing of an application is managed by system tasks or task managers. The present invention is a subpart of the electronic mail application which enables users to send messages, documents, files, etc. to each other much like an internal manual mail service does. The present invention enables users to process a document or the like through desired recipients as opposed to merely distribute documents or copies thereof to desired recipients.

In particular, the present invention provides electronic means for a user to ask a pertinent chain of command for approval and comments of a certain request. Utilizing the present invention, the user prepares his request in the form of a route package and sends the route package by electronic mail serially from one user whose approval is sought to the next. The path along which the route package is sent is defined by a route list which is attached to the request when the route package is initially formed and sent by the originator. The route list therefore specifies an ordered list of originator selected recipients. The route list also specifies originator selected options in which each recipient may take action on the route package. After a recipient has received the route package and taken action (i.e. voted and/or commented) on the request, he sends the route package to the next listed recipient via electronic mail. The present invention ensures that the route package is properly processed by a recipient according to the respective specified options and is sent to the next listed recipient.

The options specified by the route list include processing or voting options of each recipient. The processing/voting options state how each recipient may vote (approve, disapprove, abstain) on the request, and may further state the option of certain recipients to interrupt circulation of the request by returning the request to the originator for second consideration. In the latter case, after the route package is sent back to the originator via electronic mail, the originator has the option of continuing the circulation. Default voting options and recipient re-routing capabilities are also provided by the present invention.

This method and device for circulating a document also provides protection of the integrity of the request. Once the route package is initially sent by the originator, the package cannot be copied by a recipient without destroying the copy's form as a "route package" (i.e. an original request with an associated route list). This is accomplished by a specific data structure being defined for route packages. It is within the data structure that the route list is attached to or associated with the original request to form a non-interchangeable "route package".

Figure 1B:
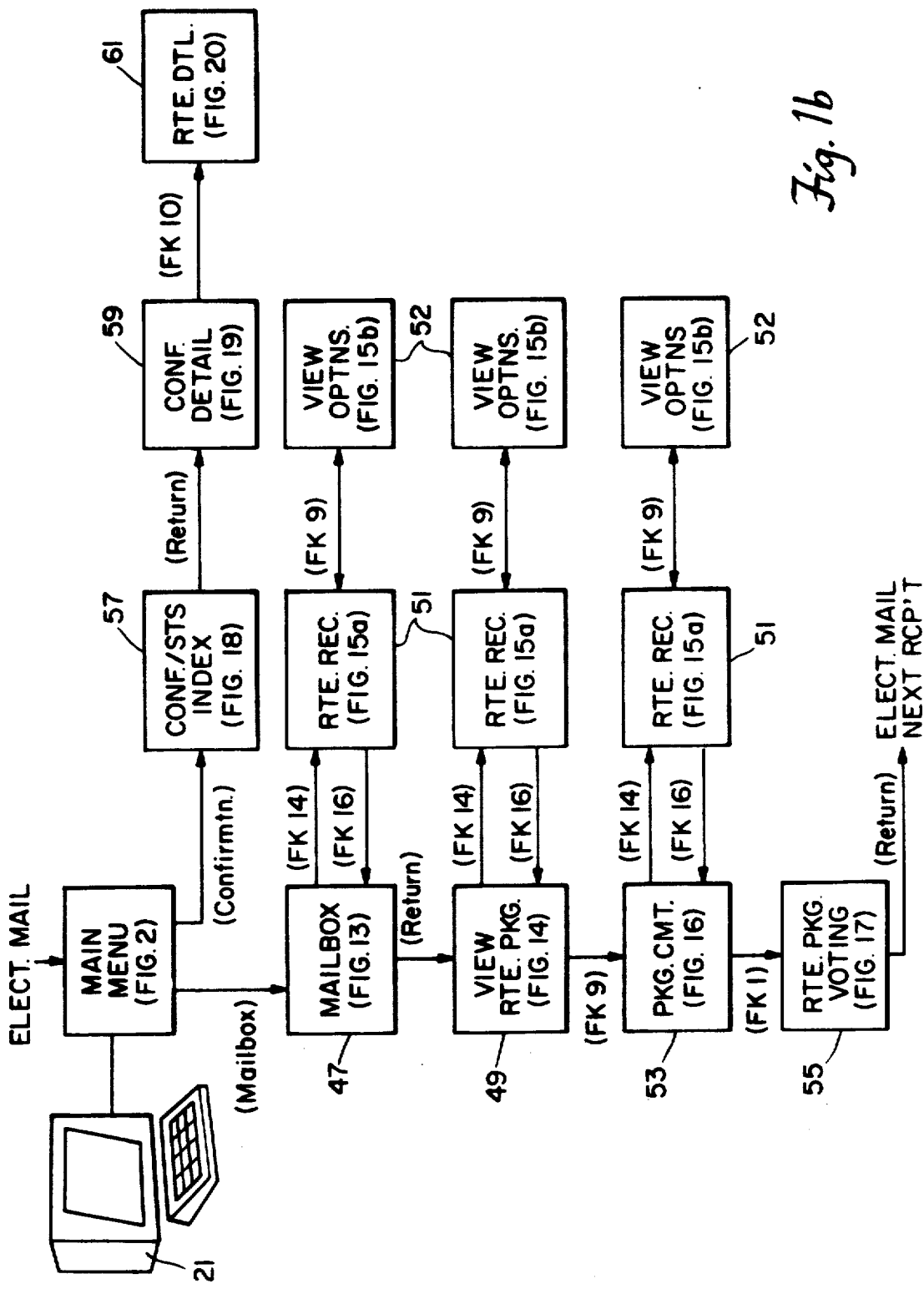

An electronic mail circulation device embodying the present invention is schematically shown in FIGS. 1a and 1b. A user at terminal 21 is presented with a main menu 23, shown in detail in FIG. 2, of the operating computer system. From this menu the user is able to choose one of three listed categories of operation—View, Send, Other. The "view" operation enables the user to view items he has received by electronic mail in his mailbox, to view bulletin board messages publicly (visible by all users) posted by other users, and to view confirmations (return replies of requests he has previously sent). The steps of the former and latter as related to route packages are illustrated in FIG. 1b. The "send" operation enables the user to transmit items to other users in the form of a memo, phone message, invitation or package. The "other" operation enables the user to access control over Distribution Lists or Route Lists, to manage designated alerts, and to post a bulletin. An outline of the steps involved in sending a route package and creating a route list is shown in FIG. 1a. The "view: confirmations", "send: memos or packages", and "other: route lists" operations are utilized in the present invention and discussed further.

In order to access the data base containing the user's previously defined route lists, the user positions the cursor next to the "Route Lists" option in the main menu 23 and presses the Return key of terminal 21. The user is then presented with Manage Route Lists screen 25 which lists the names and attributes of his previously defined route lists as shown in FIG. 3. Next to the name of each route list on screen 25 is the name of the owner of the list, the number of recipients specified in the list, the date the list was last modified and an indication of whether the list is public (accessible by other users) or private (accessible only by the owner). From screen 25, the user is able to view and edit a route list, create a new route list or delete an existing route list. These tasks are performed by the user pressing Function key "6", "7" or "8" respectively as directed on screen 25. Editing or deleting a list is accomplished by word processing functions which are common in the art. In order to create a route list, the user presses function key "7" and follows a set of submenus (screens) to choose the names of desired recipients, their respective voting options and re-routing abilities.

The first submenu presented after the user presses Function key 7 from screen 25 in FIG. 3 is a screen which displays names listed in the files of the Corporate Directory database 29 as shown in FIG. 1a. An illustration of the Corporate Directory screen 27 is provided in FIG. 4. As indicated on screen 27, the user may search the Corporate Directory database 29 for desired names of recipients for the route list he is creating by pressing Function key:

"2" to reach the top of the directory;
"3" to reach the bottom of the directory;
"4" to proceed to the previous screen of names in the directory;
"5" to proceed to the next screen of names in the directory; and
"9" to find a particular name.

Once the user has found a name of a desired recipient, the user types an "X" by that name. The user may mark all the names on the screen by pressing function key 6 and may erase all markings on the current screen by pressing Function key 7. When the user is finished selecting the desired recipients for the new route list which he is creating, he presses the Return key.

The user is then presented with Route List Recipients screen 31 as shown in FIG. 5. Screen 31 lists the names of the recipients chosen by the user from the Corporate Directory in screen 27 of FIG. 4. Next to each recipient's name on screen 31 in FIG. 5, the user inserts a voting option and an indication of the re-routing ability of the respective recipients. The user accomplishes this with Function keys 6 and 7 respectively as designated on screen 31. Pressing Function key 6 cycles through seven voting options for the recipient at the current cursor position. The seven voting options are:

Accept, or Reject and continue route package to next recipient;
Accept, or Reject and return to originator;
Accept, or Reject and continue, or reject and return to originator;
Accept, or Reject and continue, or abstain;
Accept, or Reject and return, or abstain;
Accept, or Reject and continue, or reject and return, or abstain;
No decision required.

When none of the above voting options is assigned for a particular recipient, a default is used. The default value is stored in a User Profile file of the User Administration database 33 of FIG. 1a. The default voting option of the user (originator) stored in the User Profile at the time he initially mails the route package is used. Default values are indicated on screen 31 by an asterisk next to the voting option.

Pressing Function key 7 on screen 31 of FIG. 5 cycles through the different re-routing abilities the user may assign a recipient at the current cursor position. A recipient may re-route the route package by editing the route list if he is assigned a re-routing ability of "Yes". He may edit the route list by adding names, deleting names, and/or changing the order of the names in the route list. A recipient may not change the route list if he is assigned a "No" re-routing ability. Recipients not assigned a "Yes" or "No" re-routing ability under the "List Editing" column of screen 31 are assigned a default value from the User Profile of the user (originator) at the time he initially sends the route package. The default value is indicated on screen 31 by an asterisk next to the re-routing option.

Pressing Function key 8 on screen 9 removes the recipient at the current cursor position from the route list.

Pressing function key 9 on screen 31 permits the user to toggle between indications of "Public" and "Private" access for the route list. A "Public" route list is made available to any other users sending route packages and selecting route lists to address their route packages. A "Private" route list is accessible only by the owner for attaching to a package. Screen 31 currently shows the list being created is "Private".

Function keys 10, 11 and 12 on Screen 31 enable the user to arrange the names of the recipients in a desired order and to make multiple entries of the same name. Further, his name may appear one or more times on the list. Function key 10 makes a copy of the recipient entry at the current cursor position. The copied entry can then be moved to a new location in the list by the cursor and Return key. Hence, the recipient is listed twice on the route list and will receive the route package at two different stages of the circulation.

Function key 11 enables the user to move the recipient entry at the current cursor position to a new position in the route list. After pressing Function key 11, the user moves the cursor to the new location for the entry and presses the Return key to place the entry in the new location. In this way, the user arranges and rearranges the entries as desired to form a route list with a particular order of selected recipients.

Function key 12 enables the user to add recipient entries (i.e. new names). The user positions the cursor at the location where he desires to insert recipients not currently listed on the route list and presses Function key 12. The Corporate Directory screen 27 of FIG. 4 will be displayed. The user is able to pick recipients from the Corporate Directory database 29 in a manner similar to that discussed with FIG. 4. After choosing new recipients, the user returns to the Route List Recipients screen 31 of FIG. 5 by pressing the Return key.

Function key 15 enables the user to print the list displayed on screen 31.

Once the user has formed the desired route list from screen 31, he indicates a name for the list in the field labelled "List Name". As shown in FIG. 5, the formed route list is named "VAC APPR". The formed route list is saved in a database with other existing route lists upon the user pressing the Return key. The user is then provided with the Manage Route Lists screen 25 similar to that of FIG. 3 but with the just formed and saved route list listed by route list name (VAC APPR) as shown in FIG. 6. The corresponding attributes of the new route list VAC APPR are also indicated on screen 25 of FIG. 6.

Function key 15 on screen 25 enables the user to print the list of route lists displayed on the screen 25.

Other route lists can be similarly formed and saved by the foregoing process. Route lists may be created at any time separate from creating mail to send. On the other hand once a desired route list is created, the user creates and sends a route package by following a different set of screens from main menu screen 23 of FIG. 2 as schematically shown in FIG. 1a. The steps for creating and sending a route package are similar to the typical steps a user would use for creating a regular mail item. It is the addressing function that is different for a route package.

From main menu screen 23 of FIG. 2 the user may choose to send a memo (a single item of mail) or a package (a collection of items) as a route package. FIG. 7 shows the Package screen 35 which is displayed to the user upon his selection from main menu screen 23 of FIG. 2 to send a package. Package screen 35 provides the user with the functions for creating a package. In particular, the user positions the cursor and presses the Return key to select types of items at the current cursor position for the contents of the package. Items such as a certain file, or document may be selected by name. The specified types of items are listed on a central portion of screen 35 upon the pressing of the Function key 6 so that the user may view a list of the contents of the package as he is creating the package.

In addition to choosing the contents of the package currently being created, the user also selects classification parameters for the package. The user accomplishes this by a corresponding Mail Classification screen 37 of FIG. 8 displayed upon the pressing of Function key 11 from screen 35 of FIG. 7. On Mail Classification screen 37, the user places an "X" to choose desired characteristics of priority (low, normal, high, immediate), security (general, limited, confidential), and type of mail (action, information, reference). The user may also change the name of the author of this mail by using Function key 9. The electronic mail system will automatically provide the originator with a confirmation of delivery of the package for each recipient if the "Delivery Confirmation" field has an "X" placed next to "Yes". If the user places an "X" next to "No" in that field, then no automatic delivery confirmation is sent to the originator when the package is placed in a recipient's mailbox. If "delivery confirmation" is desired, the user may choose to have the recipient send back an "acknowledged" or "certified" confirmation in addition to the automatic delivery confirmation. This additional confirmation is chosen by the user placing an "X" in one of the respective fields "Acknowledge" or "Certify" as shown on screen 37 in FIG. 8. In the present case, the user has chosen neither. Optionally, the user may complete the "Reply Date" field of Screen 37 with a desired month, day and year.

Function key 11 from screen 37 enables the user to establish route default parameters for the package from screen 37. After pressing Function key 11, the user is presented with Route Defaults screen 39 as shown in FIG. 9. Screen 39 displays three parameters which are specific to the package being created. The first parameter is labelled "Voting Option" and refers to the range of voting options the user will allow recipients of this package to use in the default situation. This differs from the route list selection of voting options in FIG. 5 in that voting options for each individual recipient are not specified but a general default voting option is established for all recipients of the package being created. The user defines the "Voting Option" parameter on screen 39 by placing an "X" next to one of three types of voting option ranges displayed which are:

"No decision required"
"Accept or reject"
"Accept or reject or abstain"

In FIG. 9, the last voting option range is chosen as indicated by the "X".

The second parameter on screen 39 which the user defines is for the case where a recipient of the package being created casts a vote of rejection. The user defines the second parameter to allow, in the default situation, the electronic mail task to:

continue routing;
return the package to the originator; or
allow the recipient to continue or return the package to the originator.

Again, the route list voting options of FIG. 5 specifying the same routing options to those above differ from the foregoing in that they are specific to each recipient, whereas the second parameter of screen 39 defines a default of the package being created. In FIG. 9, the user has chosen for the second parameter that the package be returnable to the originator upon a vote of rejection, as indicated by the "X" next to the second alternative.

The third parameter on screen 39 specifies whether the user will allow recipients of the package to edit a route list attached to the package. The third parameter does not specify allowable editing abilities of particular recipients rather defines a characteristic of the package being created. As indicated by the "X" next to the "No"

choice for the third parameter on screen 39, in a default case, the package being currently created will not allow recipients to edit the route list attached to it, whatever that route list may be. Note that the foregoing parameters are for default cases where the respective information (voting options, etc.) is not stated in an associated route list. The default parameters supersede corresponding defaults defined in the User Profile of the user/originator. The default parameters of screen 39, as defined by the user, are considered to be part of the package and are treated and stored accordingly upon the user pressing the Return key from screen 39.

The user then returns to the Mail Classification screen 37 in FIG. 8. At this point, the user may press Function key 16 to return back to Package screen 35 to complete the creation of the route package. The package may then be sent by pressing Function key 1.

From screen 35 in FIG. 7 the user addresses the package through an Addressing menu 41 which is displayed upon the pressing of Function key 9. From the Addressing menu 41 shown in FIG. 10, the user may select one of two listed routing options by positioning the cursor on one of the respective lines and pressing the Return key. Selection of "Routing: People" brings the user into the Corporate Directory screen 27 of FIG. 4 to select people to receive the route package. Selection is made in the manner previously discussed in FIG. 4. After selecting the names of the desired recipients from the Corporate Directory screen 27, the user presses the Return key which displays a Route Package Recipients screen 43 illustrated in FIG. 11. Screen 43 displays a list of the recipients chosen from the Corporate Directory database 29 of FIG. 1a through screen 27 and provides the user with the functions to reorder, delete, duplicate and add recipients to the list. The functions are the same as those previously discussed for screen 31 of FIG. 5. Once the user has finished creating this route list, it is attached to the package just previously created through screens 35, 37 and 39 by pressing the Return key. Hence, Screen 43 is a Route Package Recipients screen in contrast with the Route List Recipients screen 31 of FIG. 5 which creates an unattached route list. The user returns to the Package screen 35 of FIG. 7 upon the pressing of the Return key at screen 43.

Note that the above is an ad hoc method of addressing and the route list created is temporary. The route list is attached to the current package created through Package screen 35 of FIG. 7 and is not saved in the database of the other existing route lists nor is it named or declared to be "Public" or "Private".

On the other hand, selection of "Routing: Lists" from Addressing menu 41 brings the user to Route List Addressing screen 45 shown in FIG. 12. Screen 45 gives the user the ability to view and select an existing route list for attachment to the package. Route List Addressing screen 45 is different from Manage Route Lists screen 25 in FIGS. 3 and 6 in that screen 45 does not enable a user to create or modify a route list. Only one route list may be selected from the Route List Addressing Screen 45. Selection of a route list is an exclusive addressing function. That is, a mail item can either be addressed for distribution or circulation routing but not both simultaneously. If one type of addressing exists and an attempt is made to address the other way on the same piece of mail, an error message is generated. The opportunity to quit or proceed is then presented. If the user proceeds, all previous addressing is lost.

By positioning the cursor next to the name of a route list on screen 45 and pressing Function key 14, the user is able to view the contents of the list in a manner similar to screen 31 of FIG. 5. By placing an "X" next to the name of a desired route list and pressing the Return key in screen 45, the user selects a route list which is attached to the current package. The user then returns to the Package screen 35 of FIG. 7.

After the user has addressed his package by either of the two procedures discussed above, he is returned to Package screen 35 of FIG. 7. He may view the list of recipients to which the package is destined as currently addressed by pressing Function key 9 on screen 35 to display the Addressing menu 41 of FIG. 10. Pressing function key 14 on screen 41 displays the recipients. A screen similar to screens 31, 43 of FIGS. 5, 11 respectively is displayed depending on whether an existing route list or an ad hoc temporary route list was used for the addressing of the package.

After reviewing the names of the recipients to whom the package is addressed and returning to Addressing menu 41, the user may press Function key 16 to cancel the route package or Function key 1 to continue with the sending of this newly created route package. Upon pressing function key 1 from Addressing menu 41, the user returns to the Package screen 35 of FIG. 7.

At this point the package has specified contents and an attached address (i.e. route list). The user may respectively review either by pressing Function key 6 or Function key 9. The user may also save the prepared route package for sending in the future by pressing Function key 10. In that case, only the package contents are saved and not the addressing. The route package is saved in a local database of the user in the form of a special data structure for route packages, to be discussed. Also, the user may send the route package to be circulated as addressed by pressing function key 1 of Package screen 35.

FIG. 1b illustrates that when a recipient receives a route package it is indicated in his Mailbox screen 47 as shown in FIG. 13. Mailbox screen 47 is obtained through the main menu screen 23 of FIG. 2 by the recipient selecting "View: Mailbox". Mailbox screen 47 lists the items received in the recipients mailbox. Screen 47 also shows the content types of each item in the recipient's mailbox. The content type of "Rte Pack" (route package) is an active item that is currently in the recipient's mailbox waiting to be read, voted on and sent along to the next recipient on the route list. A content type of "Comp Rte" (completed route package) is a route package which has been read by the last recipient listed on the package's route list. From the Mailbox screen 47 the recipient is able to move, delete and view the mailbox items listed by pressing Function keys 10, 8 and the Return key, respectively. However, the move and delete operations of function keys 10 and 8 have no effect on route packages (Rte Pack) due to the route package being a mail item of predetermined circulation and control. Upon the pressing of the Return key, the mail item at the current cursor position, for example the first entry "Vacat Request Form", on screen 47 of FIG. 13 is displayed on screen 49 of FIG. 14. Screen 49 displays the route package sent by "J. User" and lists the contents of the route package which at this time includes the original contents plus two memos added by the two previous recipients of the route package. The current recipient, Lee Tru, is able to view each item listed in the contents of the route package using Function keys 4 and 5.

Function key 14 of View Route Package screen 49 enables the user to view the recipients of the route package. Upon pressing Function key 14 a screen 51 of route recipients as shown in FIG. 15a is displayed before the user. Route Recipients screen 51 shows all the intended recipients listed on the route list of the route package. In addition, for the recipients who previously received the route package, screen 51 displays the vote, date and time at which the package was sent along from each previous recipient and the number of items the recipient added to the route package.

In the example of FIG. 15a, the recipient of this route package (Lee Tru) is able to modify the route list because the originator gave him list editing privileges in FIGS. 5 or 11. This means that when viewing the Route Recipients screen 51, this recipient may add, delete, modify or move recipient names that occur after his name using Function keys 12, 11, 10 and 8. If list editing was set to "No" for this user in FIGS. 5 or 11, the copy, move, add and delete Function keys would not be shown as available on screen 51. These Function keys work the same as the corresponding keys on the Route List Recipients screen 31 of FIG. 5 with the exception that previous recipients and the current recipient may not be altered.

Function key 9 enables the user to switch back and forth between screen 51 and screen 52 of FIG. 15b. Screen 52 displays the voting and list editing options which were assigned to each of the recipients by the originator. After viewing the voting and list editing options, the user can return to Route Recipients screen 51 of FIG. 15a and edit the list as he desires. Once the user has edited the route list, he is able to return to screen 49 of FIG. 14 to view the route package by pressing function key 16 of Route Recipients screen 51.

Route Recipients screen 51 and the screen 52 of recipient options can be viewed in a similar manner using Function keys 9, 14, and 16 from Mailbox screen 47, Package comment screen 53, and Route Package Voting screen 55 as shown in FIG. 1b.

After viewing the items in the route package and the recipient list, the user is able to vote and send the route package onto the next recipient in the route list by pressing Function key 9 in screen 49 of FIG. 14. Upon pressing Function key 9, a Package Comment screen 53 is displayed as shown in FIG. 16. The Package Comment screen 53 gives the user the opportunity to add any additional comment to the route package before voting and sending the route package to the succeeding recipient. The adding of comments to the route package through Package Comment screen 53 is done in a manner similar to that in creating the contents of a package from Package screen 35 of FIG. 7.

After adding the desired comments the user may then press Function key 1 to have the Route Package Voting screen 55 appear as illustrated in FIG. 17. The Route Package Voting screen 55 requests the user to enter an approval password in addition to casting a vote for the route package. Each user must have an approval password to process route packages. The approval password is defined and changed only by the user/owner. This password is preferably different from his user password or I.D. with which he gains access to the system. The approval password is encrypted and never displayed during use. Such a password ensures the integrity of the voting on the route package by validating the identity of the recipient at the time of voting.

Also note in FIG. 17 that the selection or choices of votes which is displayed for each recipient is established by the originator during the formation of the route package. After the password and vote are entered, pressing the Return key removes the route package from the current recipients mailbox (Lee Tru) and sends it along to the next recipient's mailbox (Jane Hans) through electronic mail. If "No Decision Required" is the voting option, Voting Screen 55 is not displayed and the route package is sent along to the next recipient.

After sending the route package to the next recipient, the sending recipient is returned to the Mailbox screen 47 of FIG. 13. If the sending recipient is the last recipient on the route list then the recipient is notified on the Route Package Voting screen 55 (FIG. 17) that the route package will be completed upon his voting. Pressing the return key from screen 55 will convert the route package into a completed route package (Comp Rte) and will return the recipient to the Mailbox screen 47 of FIG. 13 with the corresponding entry on the screen correctly marked "Comp Rte".

As illustrated in FIG. 1b, the originator of the route package is able to read his confirmations of the route package by selecting the "View: Confirmations" entry on the main menu screen 23 of FIG. 2. Upon making that selection the user is presented with the Confirmation/Status Index screen 57 shown in FIG. 18. This screen lists the confirmations of various mail items sent by the originator. The name, content, date and time initially sent, delivery status, and certify/acknowledge status of each mail item requesting a confirmation is listed on screen 57. Route packages are designated as "Rte Pkg" in the content field of screen 57. The delivery status field for a route package may have one of two values. A value of "Active" means the route package is still in the process of being serially circulated to the recipients on the route list. A delivery status of "All" indicates that the route package has completed the circulation cycle specified on the route list. Screen 57 allows the user to individually view each of the listed confirmations by positioning the cursor next to the desired confirmation entry and pressing the Return key.

Upon pressing the Return key the user is presented with a Confirmation Detail screen 59 as shown in FIG. 19. Confirmation Detail screen 59 shows the various recipients who have confirmed the receipt of the route package currently positioned by the cursor. Confirmation Detail screen 59 lists the location, delivery date and time to each recipient, and date and time of certification from each listed addressee/recipient.

Function key 10 of Confirmation Detail screen 59 enables the user to view Route Detail screen 61 of FIG. 20 which displays further details of each recipient listed on the route list. Screen 61 displays route specific information for each recipient of the route package. That is, the location of the recipient, the vote cast by the recipient, and date and time that each recipient has sent the route package to the next recipient is displayed next to the name of each recipient. Note in FIG. 20 that the most recent recipient Lee Tru has not yet voted or sent the route package along to the next recipient.

After viewing screen 61 the user may exit by pressing Function key 16. This returns him to the Confirmation/Status Index screen 57 of FIG. 18 where he may review confirmation entries from other pieces of mail.

In support of the route package application, one screen of the User Profile file in the User Administration application enables a user to define his route defaults as shown on screen 63 of FIG. 21. Screen 63 displays the route default screen 39 of FIG. 9. The values which a user chooses on this screen are used as defaults when he sends a route package which does not specify in its route list or package classification the corresponding default voting and routing options.

Figure 23:
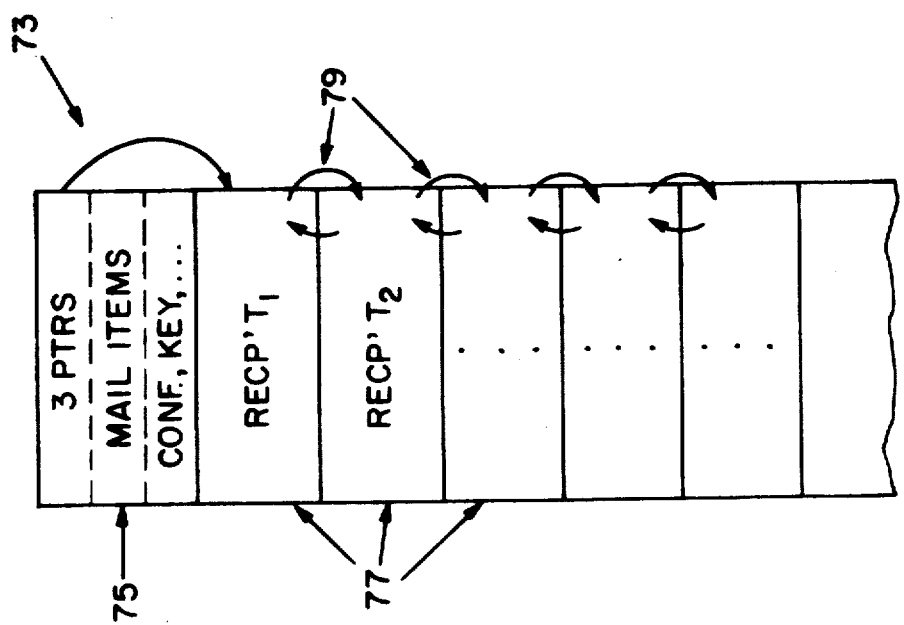
FIGS. 22 and 23 are schematics of the data structure employed by the present invention.
Figure 22:
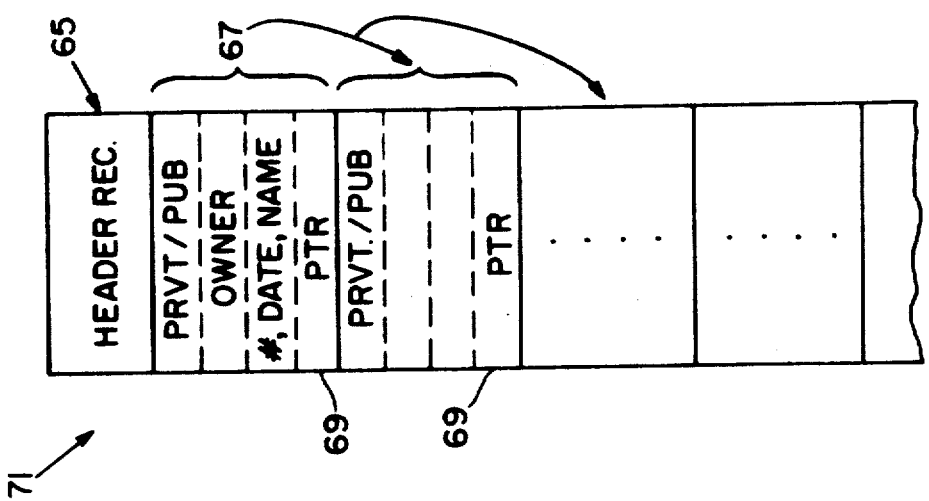

Also in support of the route package application of the electronic mail are two data structures shown in FIGS. 22 and 23. As each route list (public or private) is created, it is stored in the form of a Route Definition file 73 shown in FIG. 23. In order to keep track of all created and stored route lists, the lists are catalogued in a Route List Directory file 71. Shown in FIG. 22 is the preferred data structure for the Route List Directory file 71 which is an indexed file with an 18 byte key. The Route List Directory file 71 enables the display of screen 25 of FIG. 3 to be made. File 71 contains a single header record 65 and a detail record 67 for every stored route list (public or private) of every user. The header record 65 contains the name of the next available file to use for the creation of a route list or Route Definition file. Each detail record 67 contains an indication of whether the respective route list is Private or Public, the identification of the creator of the Route list, and a pointer to the actual Route Definition file created in screen 31 of FIG. 5. Each detail record 67 also contains the number of recipients on the respective route list, the name of the route list, the creation date and most recent date of modification of the list. The foregoing information is used to display Manage Route Lists screen 25 of FIG. 3.

For each route package created, a Route Definition file is generated. A Route Definition file is the data structure which attaches a route list to desired mail items and internally describes a route package to the processing system. The information as to each destination in the circulation and how each recipient may treat the route package is contained in the Route Definition file as defined by the originator through the above described package creation process. FIG. 23 shows a general form of a Route Definition file 73. File 73 has one header record 75 and for each recipient one recipient record 77.

Header record 75 contains three location pointers—one to the recipient who currently has the route package in his mailbox; a second one to the first recipient in the route list of the route package; and a third pointer to the last intended recipient of the route package. Header Record 75 contains information of the originator and a key/address of a confirmation record in which to store confirmations from each recipient. Header record 75 holds an indication of the origination of the mail items which form the contents of the route package. Header record 75 also contains the mail classification information set by the originator on screen 37 of FIG. 8 which includes a reply date and/or a specification of priority, security and mail type.

The header record 75 also keeps track of the number of mail items in the route package when the originator sent the route package, the current number of pieces in the route package including appended comments, and the number of recipients currently on the route list. Two fields of the header record 75 contain the default voting options and list editing ability as set by the originator on Route Defaults screen 39 of FIG. 9. Another field of the header indicates the current number of recipients the route package has been delivered to including the mailbox where it is currently located. This field is utilized in the displaying of Confirmation/Index screen 57 of FIG. 18.

As previously mentioned, each recipient record 77 provides information of one recipient on the route list. The records 77 form a linked list with each recipient record containing a pointer 79 to the previous recipient who had the route package and a pointer 79 to the next recipient who is to receive the route package in his mailbox. The recipient record 77 also contains information on the respective recipient. Another field of the recipient record 77 contains the number of comments inserted into the package by this recipient. Two other fields contain the route list editing and voting options for this particular recipient as defined by the originator in the Route List Recipients screen 31 of FIG. 5 or by default in the package from screen 39 of FIG. 9 as held in header record 75. If no package default from screen 39 was defined, then the default values held in header record 75 are defined by the User Profile of the originator described in FIG. 21. Another field contains an indication of the vote the recipient cast, and the time in hours-minutes and year-month-day forms when the recipient voted and sent the route package to the next recipient. This information is used to display the confirmation information to the originator as illustrated on screen 59 of FIG. 19 and screen 61 of FIG. 20.

Figure 24:
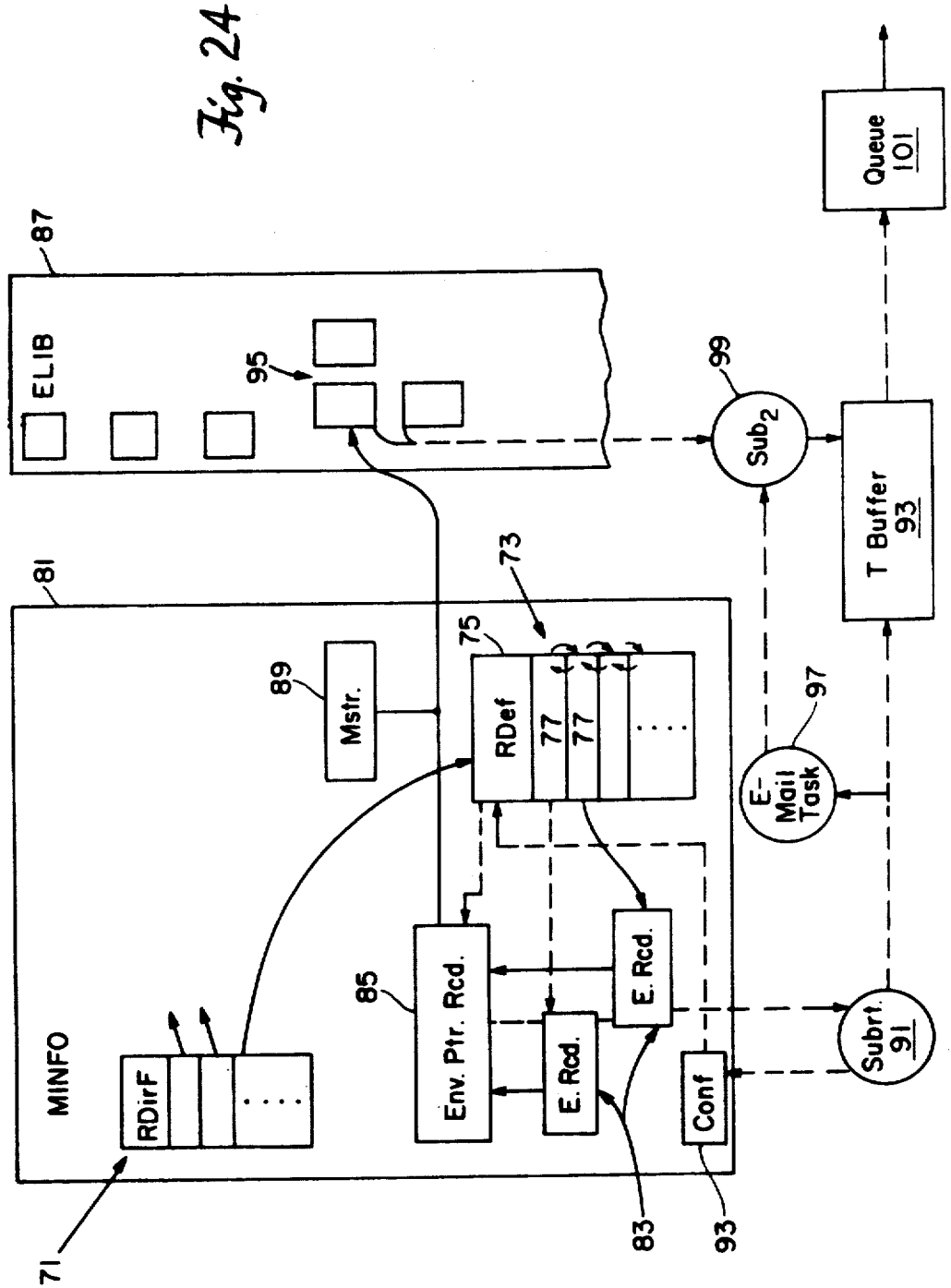
FIG. 24 is a schematic diagram of an embodiment of the present invention.

A digital data processing system builds and manages the two data structures 71 and 73 of FIGS. 22 and 23 in conjunction with the above described interactive programs of FIGS. 2–20 in the following manner as shown in FIG. 24. The interactive program for creating a route list described in FIGS. 3–6 generate the header record and the detail records 67 of the Route List Directory file 71 of FIG. 22 in a Major Information database (MINFO) 81. Each time a user creates a route package through the interactive program described in FIGS. 7–12, a Route Definition file 73 of FIG. 23 is formed in MINFO 81. The recipient records 77 of the Route Definition file 73 and their order are defined by the chosen route list in the addressing portion of creating the route package. For each recipient record 77, an associated E record 83 is created in the MINFO database 81. The E records 83 point to a common envelope pointer record 85 in the MINFO database. The envelope pointer record 85 points to the files 95 which are the mail items to be sent or the contents of the route package designated by the user on Package screen 35 of FIG. 7. The envelope pointer record 85 receives address information of the to-be-sent files 95 from the header record 75 of the Route Definition file 73. The files 95 which are to be sent are stored in a holding library (ELIB) 87 as an unstuffed envelope and are tagged with a package I.D. number. A master record 89 of the MINFO 81 assigns the package I.D. numbers to each file 95 during the creation of the route package. When the originator sends the route package by pressing Function key 1 on screen 35 in FIG. 7, the interactive program calls a subroutine 91 which writes the E records 83, the list of recipients, and the list of to-be-sent files 95 to a temporary buffer (TBUFF) 93. If delivery confirmation was selected for the package in FIG. 8, the subroutine 91 also establishes a confirmation record 93 in MINFO 81. The key or address of this confirmation record 93 is saved in header record 75 of the Route Definition file 73.

The subroutine 91 alerts the electronic mail task 97 that mail has been written to TBUFF 93. The electronic mail task 97 calls another subroutine (Sub$_2$) 99 to process the mail in TBUFF 93. By package I.D. number, Sub$_2$ 99 formats the files 95 to be sent in ELIB into a "stuffed envelope" format which is placed on a mail queue 101 and subsequently transferred to the first recipient designated by the header record 75 of the Route Definition file 73.

For each recipient, the pointers 79 of the Route Definition file 73 of FIG. 23 define the next recipient to whom the route package is to be sent. The list editing and voting options in each recipient record 77 of the Route Definition file 73 are used in displaying to each recipient how he may vote on the package, and in error checking by the system so that the recipient doesn't treat the package in a manner in which he is not specified or allowed. The confirmation key number of the Route Definition file header record 75 tells the processing system and the electronic mail task 97 where to write confirmation information of the recipients for this package. It is this confirmation record 93 that is read by the originator in FIGS. 18–20. Recipient voting information is recorded in respective recipient records 77 of the Route Definition file 73.

In addition, the Route Definition file 73 does not allow the package in whole to be copied by a recipient without changing the route package character of the package. The original mail items as pointed to from the header record 75 of the Route Definition file 73 and the route list are fixedly associated with each other by the Route Definition file 73 to define a route package. Any copy or duplicate of the contents of the package is not referenced in the header record of the route definition file and cannot be passed along in place of the original contents. This insures the integrity of the route package and that the initial documents (package content items) are as they were when sent by the originator.

While the invention has been particularly shown and described with reference to embodiments thereof, it will be understood by those skilled in the art that various changes in form and details may be made therein without departing from the spirit and scope of the invention as defined by the appended claims.

We claim:

1. Mail circulation apparatus comprising:
   mail items to be circulated by a sender;
   means for enabling the sender to (i) establish a desired circulation list and (ii) combine the circulation list and the mail items to form a route package for containing the mail items as initially sent by the sender; the circulation list providing an indication of sender selected recipients who are to, one at a time and one from another, in serial order, receive the route package, the route package being unique such that it is distinguishable over other mail items by containing the mail items as initially sent by the sender; and
   an electronic mail system for transferring the route package in a manner such that the route package is distinguished from other mail times, the electronic mail system being responsive to the circulation list in the route package for serially delivering the route packing in serial order, from one sender selected recipient to the next sender selected recipient indicated on the circulation list, and for indicating to each recipient distinction of the route package over other mail items sent to the recipient by the electronic mail system, the route package containing the mail times as initially sent by the sender from one recipient to the next.

2. Mail circulation apparatus as claimed in claim 1 wherein:
   the circulation list further provides an indication of a sender chosen order in which the selected recipients are to, one at a time, receive the route package; and
   the electronic mail system responds to the circulation list for each selected recipient by providing the route package to the succeeding selected recipient according to the circulation list.

3. Mail circulation apparatus as claimed in claim 1 wherein:
   the circulation list further requires recipients to vote on the route package.

4. Mail circulation apparatus as claimed in claim 3 wherein:
   the means enable the sender to specify on the circulation list voting options for each selected recipient.

5. Mail circulation apparatus as claimed in claim 3 wherein:
   the vote from each recipient is recorded in a central area which is readily accessible by the sender during circulation of the route package.

6. Mail circulation apparatus as claimed in claim 3 wherein:
   the circulation list specifies that particular selected recipients may vote to interrupt circulation of the route package; and
   the electronic mail system responds to a vote by one of the particular selected recipients to interrupt circulation by returning the route package to the sender.

7. Mail circulation apparatus as claimed in claim 6 wherein the electronic mail system further responds to the sender to continue circulation by delivering the route package to the succeeding listed recipient of the one particular selected recipient.

8. Mail circulation apparatus as claimed in claim 3 wherein the recipient must identify himself with a password before voting.

9. Mail circulation apparatus as claimed in claim 1 wherein:
   the circulation list allows certain sender chosen recipients to modify the circulation list; and
   the electronic mail system further responds to the circulation list which has been altered by any of the certain sender chosen recipients, by delivering as the route package the mail items and altered circulation list to the succeeding recipient according to the altered circulation list.

10. Mail circulation apparatus as claimed in claim 1 wherein:
    the circulation list specifies that particular selected recipients may vote to interrupt circulation of the route package; and
    the electronic mail system responds to a vote by one of the particular selected recipients to interrupt circulation by returning the route package to the sender.

11. Mail circulation apparatus as claimed in claim 10 wherein the electronic mail system further responds to the sender to continue circulation.

12. Mail circulation apparatus as claimed in claim 1 wherein the means further enables recipients to associate added information with the route package.

13. Mail circulation apparatus as claimed in claim 12 wherein the electronic mail system further responds by delivering the route package and the added information to the successive recipient indicated on the circulation list.

14. Mail circulation apparatus as claimed in claim 1 wherein the means include a data structure having:
   a pointer to the mail items; and
   a series of records, one record for each recipient, the series corresponding to the circulation list.

15. Mail circulation apparatus comprising:
   mail times to be circulated by a sender;
   means for enabling the sender to establish (i) a circulation list and (ii) an association between the circulation list and the mail times to form a unique route package which is distinguished over other mail times by containing the mail items as initially sent by the sender; the circulation list providing an indication of sender selected recipients who are to, one at a time and one after another, receive the route package, and the means further enabling recipients to associate added information with the route package but the mail items remaining as initially sent by the sender; and
   an electronic mail system for transferring the route package in a manner such that the route package is distinguishable over other mail times, the electronic mail system being responsive to the circulation list in the route package for serially delivering the route package, from one sender selected recipient to the next sender selected recipient indicated on the circulation list, and for indicating to each recipient a distinction between the route package and other mail items transmitted to the recipient by the electronic mail system, the electronic mail system responding to recipients of the route package by delivering the route package and any added information from a recipient to successive recipients, one at a time and one after another, as indicated on the circulation list, the route package all the while containing the mail items as initially sent by the sender.

16. Mail circulation apparatus comprising:
   mail items to be circulated by a sender;
   means for enabling the sender to (i) establish a desired circulation list and (ii) combine the circulation list and the mail items to form a unique route package for containing the mail items as initially sent by the sender; the circulation list providing an indication of sender selected recipients who are to, one at a time and one from another, in serial order, receive the route package, and the circulation list requiring recipients to vote on the route package, the circulation list specifying that particular selected recipients may vote to interrupt circulation of the route package; and
   an electronic mail system for transferring the route package, the electronic mail system responsive to the circulation list in the route package for serially delivering the route package in serial order, from one sender selected recipient to the next sender selected recipient indicated on the circulation list, the route package containing the mail items as initially sent by the sender from one recipient to the next, the electronic mail system responding to a vote by one of the particular selected recipients to interrupt circulation by returning the route package to the sender.

17. Mail circulation apparatus as claimed in claim 16 wherein the electronic mail system further responds to the sender to continue circulation by delivering the route package to the succeeding listed recipient of the one particular selected recipient.

18. Mail circulation apparatus comprising:
   mail items to be circulated by a sender;
   means for enabling the sender to (i) establish a desired circulation list and (ii) combine the circulation list and the mail items to form a unique route package for containing the mail items as initially sent by the sender; the circulation list providing an indication of sender selected recipients who are to, one at a time and one from another, in serial order, receive the route package, and the circulation list requiring recipients to vote on the route package, the circulation list specifying that particular selected recipients may vote to interrupt circulation of the route package; and
   an electronic mail system for transferring the route package, the electronic mail system responsive to the circulation list in the route package for serially delivering the route package in serial order, from one sender selected recipient to the next sender selected recipient indicated on the circulation list, the route package containing the mail items as initially sent by the sender from one recipient to the next, the electronic mail system responding to a vote by one of the particular selected recipients to interrupt circulation by returning the route package to the sender, and further responds to the sender to continue circulation.

* * * * *